Sept. 25, 1934.  R. WEDEBERG  1,974,479
LUBRICATING APPARATUS
Filed May 22, 1933
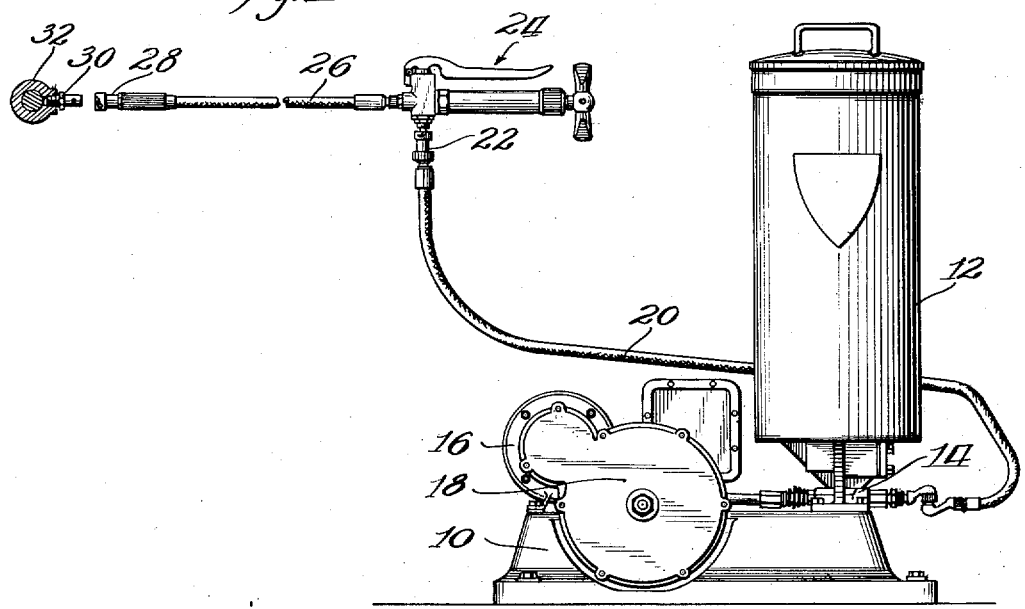
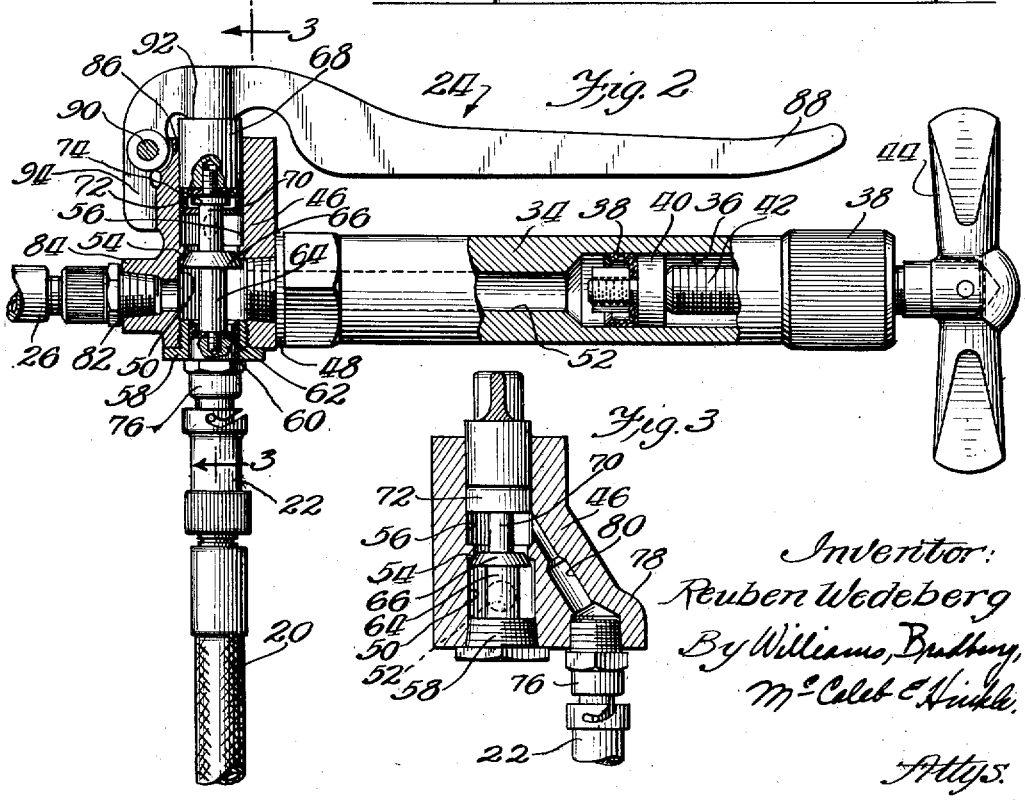
Inventor:
Reuben Wedeberg
By Williams, Bradbury,
McCaleb & Hinkle,
Attys.

Patented Sept. 25, 1934

1,974,479

UNITED STATES PATENT OFFICE 1,974,479

LUBRICATING APPARATUS

Reuben Wedeberg, Chicago, Ill., assignor to Alemite Corporation, Chicago, Ill., a corporation of Delaware Application May 22, 1933, Serial No. 672,110

9 Claims. (Cl. 221—47.3)

My invention relates generally to lubricating apparatus, and more particularly to improvements in control valves such as are used for controlling the flow of lubricant supplied by a power operated lubricant compressor.

It is an object of my invention to provide an improved control valve which requires but a slight force to cause it to open, and which will be automatically closed by the lubricant pressure.

A further object is to provide an improved flow control valve which is of simplified construction and may be very economically manufactured.

Other objects will appear from the following description, reference being had to the accompanying drawing, in which:

Fig. 1 is an elevation of a lubricant compressor and its discharge conduit in which my improved control valve is incorporated;

Fig. 2 is a longitudinal vertical sectional view of the control valve; and

Fig. 3 is a transverse sectional view thereof taken on the line 3—3 of Fig. 2.

It is at present common practice to supply lubricant to the bearings of machines, particularly automobiles, by means of a power operated lubricant compressor which is operative to discharge the lubricant under very high pressure through a flexible discharge conduit, and to govern the flow of lubricant through this conduit by means of a hand operated control valve. A whip end hose having a lubricant tight connection with a fitting attached to the bearing to be lubricated is provided to convey lubricant from the control valve to the bearing.

A typical installation of an electric motor operated compressor is shown in Fig. 1, the compressor comprising a base 10 which may be bolted to the floor or be mounted upon casters or trucks, a lubricant reservoir 12, a pump 14, a motor 16, and a driving mechanism contained in a housing 18. The lubricant is discharged from the pump through a conduit 20 which at its end has a coupler 22 secured thereto. This coupler may be of any suitable construction, preferably of the type shown in the patent to Gullborg No. 1,307,734. The control valve designated generally 24 has a whip end flexible discharge conduit 26 secured thereto, said conduit terminating in a coupler 28 which may be similar to the coupler 22 and is adapted to make a detachable connection with a lubricant receiving fitting 30 threaded in the oil hole of a bearing 32 to be lubricated. The fitting may be likewise constructed as shown in the aforesaid patent to Gullborg.

The control valve 24 comprises a cylindrical handle 34 which has a cylindrical bore 36 formed therein, the end of which is closed by a cap 38 threaded to the handle 34. A piston comprising a cup leather 38 secured to a backing and guide member 40 is freely reciprocable in the bore 36 and is adapted to be pressed forwardly to eject the contents of the bore (to the left, Fig. 2) by a stem 42 threaded in the cap 38 and having a T handle 44 secured at its outer extremity.

The handle body 34 is threaded into a valve body 46, a suitable gasket 48 being provided to prevent leakage of lubricant. The valve body 46 has a cylindrical chamber 50 formed therein which communicates with the cylindrical bore 36 through a passageway 52. An inwardly projecting shoulder 54 in the valve body 46 forms a valve seat and separates the chamber 50 from a cylindrical bore 56 in the upper end of the valve body 46. The lower end of the chamber 54 is closed by an accurately bored bushing 58 in which a cylindrical piston member 60 is reciprocable, the latter being in the form of a nut for securing a cup leather piston 62 to a valve stem 64. A frusto-conical valve 66 may be formed integrally with the stem 64 and is adapted to engage the shouldered valve seat 54. A plunger 68 is freely reciprocable in the cylindrical bore 56, and secured to the upper portion 70 of the stem 64, a cup leather 72 being clamped between a flange 74 formed on the stem and the lower face of the cylindrical plunger 68. It will be noted that the cylindrical bore 56 is of slightly greater diameter than that of the bore in the bushing 58. Lubricant is supplied to the control valve through the conduit 20, the coupler 22 of which is detachably secured to a fitting 76 (Fig. 3). The fitting 76 is threaded in a sidewardly extending boss 78 formed on the valve body 46 and lubricant supplied to the fitting is adapted to flow through a passageway 80 drilled in the body 46 to the cylindrical bore 56 between the cup leather 72 and the valve seat 54. The whip end discharge conduit 26 has a connecting fitting 82 threaded in a boss 84 formed integrally with the valve body 46 so that the discharge conduit will be in communication with the chamber 50.

The valve body 46 has a pair of ears 86 between which the end of a control lever 88 is pivoted by means of a transverse pivot pin 90. The control lever 88 has a projection 92 adapted to engage the end of the plunger 68 to depress the latter. The swinging movement of the lever 88 is limited by the engagement of a stop extension 94 of the lever with the valve body 46.

Assuming that the lubricant compressor is of the continuously operating type wherein the motor is controlled to maintain a predetermined pressure in the discharge conduit, and that the control valve 24 with its whip end discharge conduit 26 has been coupled to the discharge conduit 20, the operation will be as follows:

The operator will with his right hand attach the coupler 28 of the whip end hose to the fitting 30 to be supplied with lubricant and lightly press upon the control lever 88. The plunger 68 together with the valve 66 and all parts assembled therewith will thereby be forced downwardly and permit the lubricant to flow from the conduit 20 through the coupler 22, fitting 76, passageway 80, into the cylindrical bore 56 from whence it will flow past the valve 66 to the bearing to be lubricated. After sufficient lubricant has been supplied to the bearing the operator will release the control lever 88 whereupon the lubricant pressure acting upon the cup leather piston 72 will force the valve 66 upwardly against its seat 54. This will take place because the area of the cup leather piston 72 subjected to lubricant pressure is greater than the corresponding area of the cup leather 62. The lubricant pressure will therefore force the valve to its seat, and since the area of the cup leather 72 is greater than the area of the valve 66 the lubricant pressure will tightly hold the latter against its seat.

When a bearing which offers such high resistance to in-flow of lubricant that the pressure developed by the lubricant compressor is insufficient to cause flow, the handle 44 is unscrewed to back the stem 42 away from the piston backing and guide 40. Then upon again opening the valve 66 the lubricant pressure will force the piston 38 together with its connected parts rearwardly until the backing member 40 abuts the end of the threaded stem 42. The valve 66 may then be permitted to close and by turning the handle 44 in a direction to advance the stem 42, the lubricant contained in the cylindrical bore 36 will be ejected through the passageway 52 and chamber 50 to the discharge conduit 26 and hence to the bearing to be lubricated. By means of this threaded stem booster pump an extremely high pressure may be developed which will, under even the most unusual circumstances, be sufficient to force the lubricant into the bearing and remove any obstruction present therein. This high pressure developed by the booster pump will not tend to unseat the valve 66 since the effective cross sectional area of the latter, which is exposed to lubricant pressure within the chamber 50, is greater than the corresponding area of the cup leather piston 62. Thus the valve 66 will be pressed against its seat with an increased force whenever the booster is operated.

It will be noted that in my improved control valve and booster mechanism no springs are used, and that the lubricant pressure is the sole force utilized to close the valve and hold it closed. The relative areas of the cup leather 72, the valve seat 54 and the cup leather 62 may be made such that the application of only a very small force upon the control lever 88 is required to open the valve. As soon as the valve is opened the downwardly directed force due to the lubricant pressure upon the upper face of the valve 66 is of course in a large measure equalized by the lubricant pressure upon the lower face thereof, but to take the place of this downwardly directed force, the lubricant presses upon the cup leather 62 so that the force required to hold the control valve open is substantially the same as that required to open it. This is due also in part to the fact that there is a slight drop in the lubricant pressure as soon as the valve is opened and the lubricant commences to flow.

While I have shown and described a particular embodiment of my invention, it will be readily understood that variations may be made in the construction disclosed without departing from the basic features of my invention. I therefore do not wish to be limited to the precise construction disclosed but wish to include within the scope of my invention all such modifications and variations which will readily suggest themselves.

What I claim as new and desire to secure by United States Letters Patent, is:

1. In high pressure lubricating apparatus, the combination of a source of lubricant under pressure, a discharge conduit for conducting said lubricant to parts to be lubricated, and a control device in said discharge conduit, said device comprising a body having a bore therethrough, a valve seat formed in said bore, a valve engageable with said seat, a piston secured to said valve and normally subjected to the lubricant pressure from said source, and a second piston secured to said valve and of smaller diameter than said first named piston, said second piston being normally separated from the lubricant under pressure at said source by said valve.

2. A control valve for high pressure lubricating apparatus comprising a body having a valve seat, a reciprocable valve engageable with said seat, said body having a relatively large bore at one side of said seat and a smaller bore at the other side of said seat, pistons secured to said valve and sliding in said bores respectively, means to conduct lubricant under pressure to said larger bore between the piston therein and said valve, and manually operable means for moving said valve from its seat.

3. A control valve for high pressure lubricating apparatus comprising a body having a valve seat formed therein, a valve engageable with said seat, means to supply lubricant under pressure to one side of said valve, means operable upon said valve to exert a force to overbalance the lubricant pressure on the exposed portion of said valve, manually operable means to move said valve from its seat to permit flow of lubricant past said seat, and means subjected to the pressure of the lubricant which has flowed past said seat to exert a force upon said valve in a direction to hold it away from its seat.

4. A control valve for high pressure lubricating apparatus comprising a body having a pair of chambers separated by a valve seat, a reciprocable valve engageable with said seat, movable walls closing the ends of said chambers and rigidly connected to said valve, and means to conduct lubricant under pressure to one of said chambers, the area of said movable wall exposed to lubricant pressure in said last named chamber being greater than the area of the valve exposed to said pressure and said area of said valve being greater than the exposed area of the movable wall in said other chamber.

5. A control valve for high pressure lubricating apparatus comprising a body having a cylindrical bore in one end thereof and a valve seat formed at the end of said bore, a plunger reciprocable in said bore, a valve engageable with said seat and rigidly connected to said plunger, a handle pivoted to said body and having a part engageable with said plunger to move the latter inwardly thereby to unseat said valve, and lubricant pressure actuated means operable when said valve is open to exert a force to supplement the force applied by said handle in unseating said valve.

6. In high pressure lubricating apparatus, the combination of a source of lubricant under pressure, a discharge conduit for conducting said lubricant to parts to be lubricated, and a device in said discharge conduit for controlling the discharge of lubricant through said conduit, said device comprising a body having a bore therethrough, a valve seat formed in said bore, a valve engageable with said seat, and a pair of differential pistons connected to said valve, one of said pistons being subjected to the pressure of the lubricant in the portion of said conduit between the device and said source and the other of said pistons being subjected to the pressure of the lubricant in the portion of said conduit between the device and the part to be lubricated.

7. A control valve for high pressure lubricating apparatus comprising a body having a valve seat, a reciprocable valve engageable with said seat, said body having a relatively large bore at one side of said seat and a smaller bore at the other side of said seat, means to conduct lubricant under pressure to said larger bore between said valve and said larger piston, manually operable means for moving said valve from its seat, and means subjected to the pressure of lubricant in said smaller bore to aid in holding said valve from its seat.

8. A control valve for high pressure lubricating apparatus comprising a body having a pair of chambers separated by a valve seat, a reciprocable valve engageable with said seat, movable walls closing the ends of said chambers and rigidly connected to said valve, means to conduct lubricant under pressure to one of said chambers, the area of said movable wall exposed to lubricant pressure in said last named chamber being greater than the area of the valve exposed to said pressure and said area of said valve being greater than the exposed area of the movable wall in said other chamber, and manually operable means to increase the lubricant pressure in said last-named chamber.

9. A control valve for high pressure lubricating apparatus comprising a body having a valve seat, a reciprocable valve engageable with said seat, said body having a relatively large bore at one side of said seat, a piston in each of said bores, and a smaller bore at the other side of said seat, means to conduct lubricant under pressure to said larger bore between said valve and said larger piston, manually operable means for moving said valve from its seat, and means to increase the lubricant pressure in said smaller bore.

REUBEN WEDEBERG.

CERTIFICATE OF CORRECTION.

Patent No. 1,974,479. September 25, 1934.

REUBEN WEDEBERG.

It is hereby certified that error appears in the printed specification of the above numbered patent requiring correction as follows: Page 3, line 98, claim 9, strike out the words ", piston in each of said bores,"; and line 99, same claim, after "seat," insert the words a piston in each of said bores,; and that the said Letters Patent should be read with these corrections therein that the same may conform to the record of the case in the Patent Office.

Signed and sealed this 13th day of November, A. D. 1934.

(Seal)

Leslie Frazer
Acting Commissioner of Patents.

ter inwardly thereby to unseat said valve, and lubricant pressure actuated means operable when said valve is open to exert a force to supplement the force applied by said handle in unseating said valve.

6. In high pressure lubricating apparatus, the combination of a source of lubricant under pressure, a discharge conduit for conducting said lubricant to parts to be lubricated, and a device in said discharge conduit for controlling the discharge of lubricant through said conduit, said device comprising a body having a bore therethrough, a valve seat formed in said bore, a valve engageable with said seat, and a pair of differential pistons connected to said valve, one of said pistons being subjected to the pressure of the lubricant in the portion of said conduit between the device and said source and the other of said pistons being subjected to the pressure of the lubricant in the portion of said conduit between the device and the part to be lubricated.

7. A control valve for high pressure lubricating apparatus comprising a body having a valve seat, a reciprocable valve engageable with said seat, said body having a relatively large bore at one side of said seat and a smaller bore at the other side of said seat, means to conduct lubricant under pressure to said larger bore between said valve and said larger piston, manually operable means for moving said valve from its seat, and means subjected to the pressure of lubricant in said smaller bore to aid in holding said valve from its seat.

8. A control valve for high pressure lubricating apparatus comprising a body having a pair of chambers separated by a valve seat, a reciprocable valve engageable with said seat, movable walls closing the ends of said chambers and rigidly connected to said valve, means to conduct lubricant under pressure to one of said chambers, the area of said movable wall exposed to lubricant pressure in said last named chamber being greater than the area of the valve exposed to said pressure and said area of said valve being greater than the exposed area of the movable wall in said other chamber, and manually operable means to increase the lubricant pressure in said last-named chamber.

9. A control valve for high pressure lubricating apparatus comprising a body having a valve seat, a reciprocable valve engageable with said seat, said body having a relatively large bore at one side of said seat, a piston in each of said bores, and a smaller bore at the other side of said seat, means to conduct lubricant under pressure to said larger bore between said valve and said larger piston, manually operable means for moving said valve from its seat, and means to increase the lubricant pressure in said smaller bore.

REUBEN WEDEBERG.

CERTIFICATE OF CORRECTION.

Patent No. 1,974,479.　　　　　　　　　　　　September 25, 1934.

REUBEN WEDEBERG.

It is hereby certified that error appears in the printed specification of the above numbered patent requiring correction as follows: Page 3, line 98, claim 9, strike out the words ", piston in each of said bores,"; and line 99, same claim, after "seat," insert the words a piston in each of said bores,; and that the said Letters Patent should be read with these corrections therein that the same may conform to the record of the case in the Patent Office.

Signed and sealed this 13th day of November, A. D. 1934.

(Seal)

Leslie Frazer
Acting Commissioner of Patents.